(12) United States Patent
Kalapatapu et al.

(10) Patent No.: US 9,532,396 B2
(45) Date of Patent: Dec. 27, 2016

(54) RELAY ARCHITECTURES FOR MOBILE WIRELESS NETWORKS

(71) Applicant: Broadcom Corporation, Irvine, CA (US)

(72) Inventors: Dutt Kalapatapu, Santa Clara, CA (US); Ahmad Rahmati, Mountain View, CA (US); Florin Baboescu, San Diego, CA (US); Kamesh Medapalli, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 85 days.

(21) Appl. No.: 14/493,071

(22) Filed: Sep. 22, 2014

(65) Prior Publication Data

US 2015/0085740 A1 Mar. 26, 2015

Related U.S. Application Data

(60) Provisional application No. 61/880,597, filed on Sep. 20, 2013.

(51) Int. Cl.
*H04W 88/04* (2009.01)
*H04W 76/02* (2009.01)
*H04W 4/00* (2009.01)
*H04W 88/18* (2009.01)

(52) U.S. Cl.
CPC ........... *H04W 88/04* (2013.01); *H04W 4/008* (2013.01); *H04W 76/021* (2013.01); *H04W 76/022* (2013.01); *H04W 76/023* (2013.01); *H04W 88/182* (2013.01)

(58) Field of Classification Search
CPC combination set(s) only.
See application file for complete search history.

(56) References Cited

U.S. PATENT DOCUMENTS

| | | | |
|---|---|---|---|
| 2008/0165776 A1* | 7/2008 | Tao | H04B 7/2606 370/392 |
| 2010/0067446 A1* | 3/2010 | Oulai | H04W 8/082 370/329 |
| 2010/0315973 A1* | 12/2010 | Hirano | H04W 8/087 370/254 |
| 2010/0315992 A1* | 12/2010 | Turanyi | H04W 8/082 370/315 |
| 2011/0032874 A1* | 2/2011 | Kim | H04W 8/08 370/328 |
| 2011/0116450 A1* | 5/2011 | Hirano | H04W 12/06 370/328 |
| 2011/0249609 A1* | 10/2011 | Brusilovsky | H04B 7/15521 370/315 |

(Continued)

*Primary Examiner* — Bob Phunkulh
(74) *Attorney, Agent, or Firm* — Sterne, Kessler, Goldstein & Fox PLLC (57) ABSTRACT

A communication device configured to route communications between one or more out-of-coverage communication devices using one or more proximity services (ProSe). For example, the communication device can be configured as a mobile device-to network relay. The communication device can be configured to route communications associated with one more out-of-coverage communication devices that are serviced by the communication device. The communication device can be configured to utilize Layer 3 routing.

20 Claims, 6 Drawing Sheets

(56) References Cited

U.S. PATENT DOCUMENTS

| | | | | |
|---|---|---|---|---|
| 2012/0238208 A1* | 9/2012 | Bienas | ................... | H04W 8/24 |
| | | | | 455/41.2 |
| 2012/0282961 A1* | 11/2012 | Bienas | ................. | H04W 24/00 |
| | | | | 455/507 |
| 2013/0016649 A1* | 1/2013 | Damnjanovic | ....... | H04W 88/04 |
| | | | | 370/315 |
| 2013/0324130 A1* | 12/2013 | Maruta | ................ | H04W 36/00 |
| | | | | 455/436 |
| 2014/0036873 A1* | 2/2014 | Cheng | ............. | H04W 36/0022 |
| | | | | 370/331 |
| 2014/0321328 A1* | 10/2014 | Zuniga | ................... | H04W 8/06 |
| | | | | 370/254 |
| 2015/0110070 A1* | 4/2015 | Liu | .................... | H04W 80/045 |
| | | | | 370/331 |
| 2015/0365878 A1* | 12/2015 | Cho | ..................... | H04W 24/10 |
| | | | | 370/254 |
| 2015/0373617 A1* | 12/2015 | Cho | ..................... | H04W 40/12 |
| | | | | 370/329 |
| 2015/0382264 A1* | 12/2015 | Cho | ....................... | H04L 69/14 |
| | | | | 370/338 |
| 2016/0014686 A1* | 1/2016 | Cho | ..................... | H04W 48/18 |
| | | | | 370/328 |
| 2016/0066234 A1* | 3/2016 | Cho | ..................... | H04W 48/18 |
| | | | | 370/331 |

\* cited by examiner

RELAY ARCHITECTURES FOR MOBILE WIRELESS NETWORKS

CROSS REFERENCE TO RELATED APPLICATIONS

This patent application claims the benefit of U.S. Provisional Patent Application No. 61/880,597, filed Sep. 20, 2013, entitled "Relay Architectures for Mobile Wireless Networks," which is incorporated herein by reference in its entirety.

BACKGROUND

Field

This application relates generally to wireless communications, including relaying communications to one or more communication devices outside of a communication environment.

BRIEF DESCRIPTION OF THE DRAWINGS/FIGURES

The accompanying drawings, which are incorporated herein as id form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings, The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards, The LTE standard is developed by the 3rd Generation Partnership Project (3GPP) and described in the 3GPP specifications and International Mobile Telecomunnications-2000 (IMT-2000) standard, all of which are incorporated by reference in their entirety. Further, 3GPP refers to a communication network as a (UTRAN (Universal Mobile Telecommunication System (UMTS) Terrestrial Radio Access Network, a E-UTRAN (Evolved UTRAN), and/or a GERAN (Global System for Mobile Communications (GSM) Enhanced Data rates for GSM Evolution (EDGE) Radio Access Network) to provide some examples. The 3GPP LTE specifications include the European Telecommunications Standard Institute (ETSI) Technical Specification (TS) 136 Series, referred hereinafter as "3GPP TS 36 Series," each of which is incorporated herein by reference in its entirety.

Although exemplary embodiments are described with reference to LTE, the more generic terms "mobile device" and "base station" are used herein except where otherwise noted to refer to the LTE terms "User Equipment (UE)" and "e-NodeB/eNB," respectively. Further, the embodiments are not limited to implementation in LTE, as other communication standards could be used, as will be understood by those skilled in the arts.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) Wireless Local Area Network(s) (WLAN) (IEEE 802.11), Bluetooth (IEEE 802.15.1 and Bluetooth Special Interest Group (SIG)), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

Figure 1:
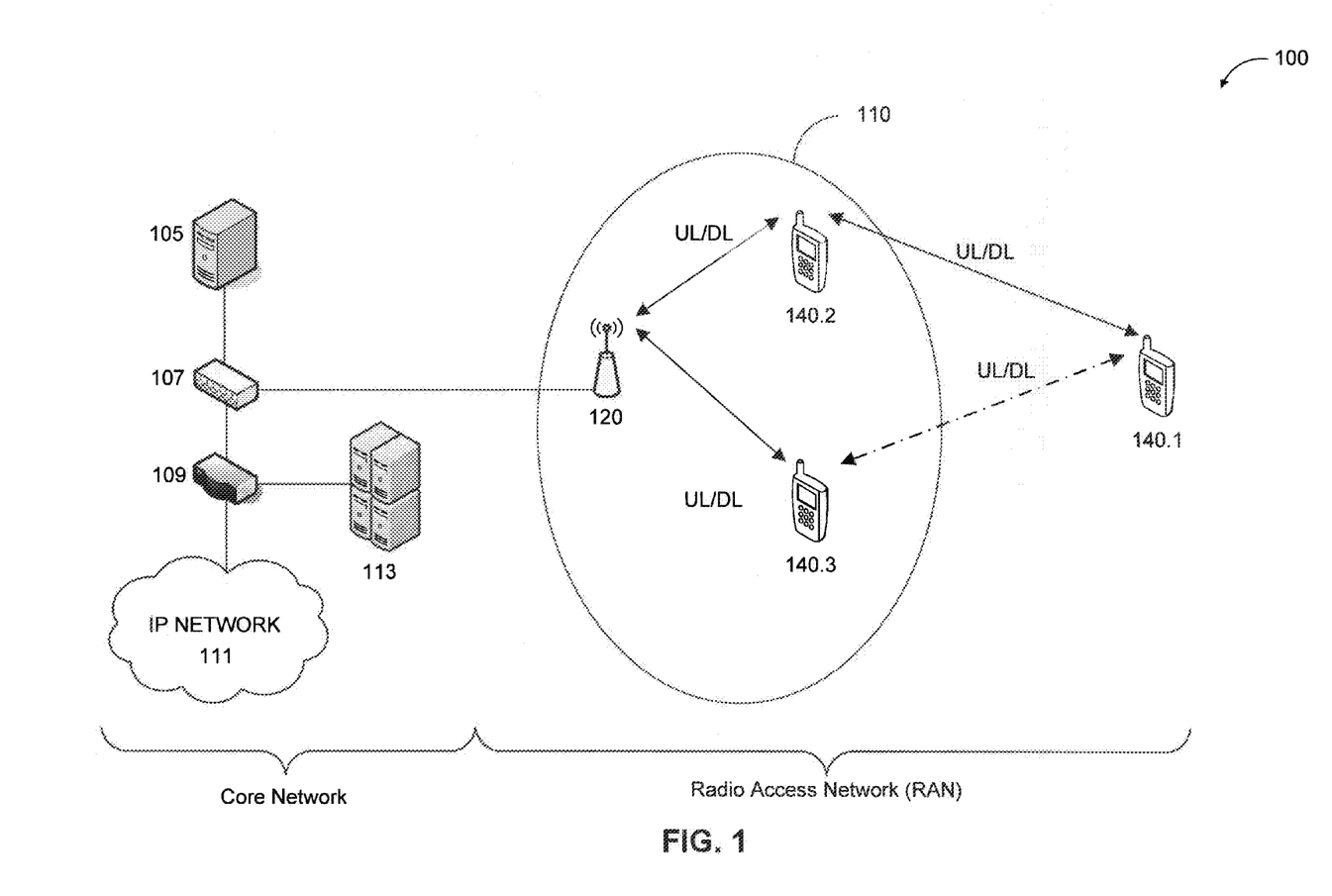
FIG. 1 illustrates an example network environment.

FIG. 1 illustrates an example communication environment 100 that includes a radio access network (RAN) and a core network, The RAN includes a base station 120, and one or more mobile devices 140. The core network includes one or more well-known communication components—such as one or more mobility management entities (MMEs) 105, one or more network switches 107, one or more network gateways 109, and/or one or more servers 113—communicatively coupled to an internet protocol (IP) backhaul network lit. For example, the base stations 120 can be communicatively coupled to the MME(s) 105 via switch(es) 107. The switch(es) 107 can be configured to communicatively couple the MME(s) 105 and base stations 120 to the IP backhaul network 111. via gateway(s) 109. The server(s) 113 can be communicatively coupled to the core network via the gateway(s) 109. The number of base stations 120, mobile devices 140, MMEs 105, switches 107, gateways 109, servers 113 and/or IP networks 111 are not limited to the exemplary quantities illustrated in FIG. 1, and the communication environment 100 can include any number of the various components as would be understood by one of ordinary skill in the relevant art(s) without departing from the spirit and scope of the present disclosure.

In an exemplary embodiment, the base station 120 and mobile device(s) 140 each include one or more processors, circuitry, and/or logic that are configured to communicate via one or more wireless technologies, and the mobile device(s) 140 are farther configured to support co-existing wireless communications. One or more of the mobile devices 140 can include, for example, a transceiver having one or more processors, circuitry, and/or logic that are configured to transmit and/or receive wireless communications via one or more wireless technologies within the communication environment 300. The base station 120 can include one or more processors, circuitry, and/or logic that are configured to: (1) receive one or more wired communications via one or more well-known wired technologies from one or more components of the core network and/or from one or more other base stations 120, and transmit, one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies to one or more components of the core network and/or to one or more base stations 120, and (3) to transmit and/or receive wireless communications via one or more wireless technologies within the communication environment 100. The wireless technologies can include one or more of the wireless protocols discussed above. The one or more processors can include (and be configured to access) one or more internal and/or external memories that store instructions and/or code that, when executed by the processors), cause the processor(s) to perform one or more operations to facilitate communications via one or more wireless and/or wired technologies as discussed herein.

In an exemplary embodiment the mobile devices 140.2 and 140.3 can be configured to communicate with the base station 120 in a serving cell or sector 110 of the communication environment 100. For example, the mobile devices 140.2 and/or 140.3 receive signals on one or more downlink (DL) channels from the base station 120, and transmits signals to the base station 120 on one or more respective uplink (UL) channels.

In exemplary embodiments, one or more of the mobile devices 140 can be configured to communicate with one or more other mobile devices 140 utilizing one or more device-to-device communication connections (e.g., using one or more personal access networks (PANs)) via one or more wireless communication protocols-such as LTE, Bluetooth. WLAN, etc. The one or more mobile devices 140 can be within, or outside of the serving cell or sector 110. For example, the mobile device 140.1 can be configured to communicate with mobile devices 140.2 and/or 140.3 via one or more UL and/or DL channels within one or more device-to-device communication connections. As illustrated in FIG. 1, mobile device 140.1 is located outside of the serving cell or sector 110 and is communicating with the mobile device 140.2 located within the serving cell or sector 110. The mobile device 140.1 can be configured to handoff the device-to-device communication connection with mobile device 140.2 and begin a device-to-device communication connection with mobile device 140.3 as represented by the dashed UL/DL channel(s). For the purposes of this disclosure, the communication between a mobile device 140 to a base station 120 via another mobile device 140 utilizing a device-to-device communication connection can be referred to as a "mobile device-to-network relay" (e.g., UE-to-network relay).

In an exemplary embodiment, the mobile device(s) 140 can be configured to utilize proximity services (ProSe) to establish one or more device-to-device communication connections. ProSe refers to the processes and/or mechanisms implemented by a mobile device 140 to discover one or more other mobile devices 140 within the proximity of the mobile device 140, and to identify one or more services provided by the other mobile device(s) 140 that may be utilized by the mobile device 140. For example, mobile device 140.1 can be configured to utilize ProSe to discover mobile devices 140.2 and/or 140.3 in the vicinity, and to discover that, the mobile devices 140.2 and/or 140.3 can function as a ProSe relay mobile device configured to allow the mobile device 140.1 to communicate with the base station 120 (via the mobile device 140.2 and/or 140.3).

Examples of the mobile device(s) 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile device 140 may be a stationary device, including, for example, a stationary computing device—such as a personal computer (PC), a desktop computer, a computerized kiosk, and an automotive/aeronautical/maritime in-dash computer terminal.

In an exemplary embodiment, the base stations 120 include one or more processors, circuitry, and/or logic that are configured for communications conforming to 3GPP's Long-Term Evolution (LTE) specification (e.g., the base stations are LTE base stations), and the mobile device 140 includes one or more processors, circuitry, and/or logic that is configured for communications conforming to 3GPP's LTE specification. The one or more processors, circuitry, and/or logic of the mobile device 140 can be further configured for communications conforming to one or more other 3GPP and/or non-3GPP protocols via one or more device-to-device communication networks established with one or more other mobile devices. In this example, the communication network 100 is an LTE communication network. In an exemplary embodiment, the communication of the mobile device 140 with one or more other mobile devices 140 can be a device-to-device communication that bypasses the base stations 120.

Those skilled in the relevant art(s) will understand that the base station 120 and the mobile device(s) 140 are not limited to the exemplary 3GPP and non-3GPP wireless protocols discussed herein, and the base station 120 and/or the mobile device(s) 140 can be configured for wireless communications conforming to one or more other 3GPP and/or non-3GPP wireless protocols in addition to, or in the alternative to, the wireless protocols discussed herein.

The switch 107 includes one or more processors, circuitry, and/or logic that are configured to route data between the various components of the core network and/or the radio access network (RAN). For example, the switch 107 can be configured to route data between one or more of the MMEs 105 and one or more base stations 120.

The gateway 109 includes one or more processors, circuitry, and/or logic that are configured to route data between the various components of the core network and/or RAN. The gateway 109 can be configured as a mobility anchor for the user plane during inter-base station 120 handovers and as an anchor for mobility between LTE and other 3GPP technologies. For idle state mobile devices 140, the gateway 109 can be configured to terminate the downlink data path and trigger paging when downlink data arrives for the mobile device 140. In an exemplary embodiment, the gateway 109 is configured as a serving gateway (SGW), a packet data network (PDN) gateway (PGW), and/or an evolved packet data gateway (ePDG).

The IP network 111 includes one or more devices and/or components configured to exchange data with one or more other devices and/or components via one or more wired and/or wireless communications protocols. In exemplary embodiments, the base stations 120 communicate with one or more service providers via the IP network 111.

The server 113 includes one or more processors, circuitry, and/or logic that are configured to process user-related information, subscription-related information, and/or proximity services (ProSe) information. The server 113 can include a memory that stores data and/or instructions, where when the instructions are executed by the processor(s), perform the functions described herein. In an exemplary embodiment, the server 113 can be configured as group communication system enablers (GCSE) application server, an Access Network Discovery and Selection Function (ANDSF) server, a home subscriber server (HSS) and/or a ProSe server. For example, the server 113 can be configured to perform mobility management, call and session establishment support, authentication and/or access authorization, connectivity and/or prioritization support for 3GPP and/or non-3GPP access networks, and/or determine the proximity of device(s) and/or the service(s) of such device(s).

The mobility management entities (MMEs) 105 each provide LTE network access control and management, and include one or more processors, circuitry, and/or logic that is configured to process UE location information and/or UE movement and speed information, perform idle mode paging and tagging procedures, and/or perform authentication procedures of one or more mobile devices 140 by interacting with one or more home subscriber servers (HSS). For authentication purposes, the MME 105 can be configured to verify the authorization of a mobile device 140 to camp on a service provider's Public Land Mobile Network (PLMN) and enforces roaming restrictions of the mobile devices 140. The MMEs 105 can also be configured to perform one or more bearer activation/deactivation procedures and/or to select a serving gateway (SGW) (e.g., gateway 109) for a mobile device's 140 initial attachment to the communication environment 100 and at times of intra-LTE. handover operations involving core network node relocations. In operation, the mobile devices 140 register with one of the MMEs 105 within the pool of MMEs 105, During maintenance of an MME, overloading of the MME, and/or any other operation as would he understood by those skilled in the relevant arts, an MME can be configured to shut down and/or restrict connections from registered mobile devices 140. In these examples, registered mobile device(s) 140 seeking an active connection to the communication environment 100 can perform a load balancing procedure that registers the mobile device(s) 340 with another MME of the pool of MMEs 105. Here, the base station 120 communicating with the mobile device(s) 140 can select the other MME for registration.

Figure 2:
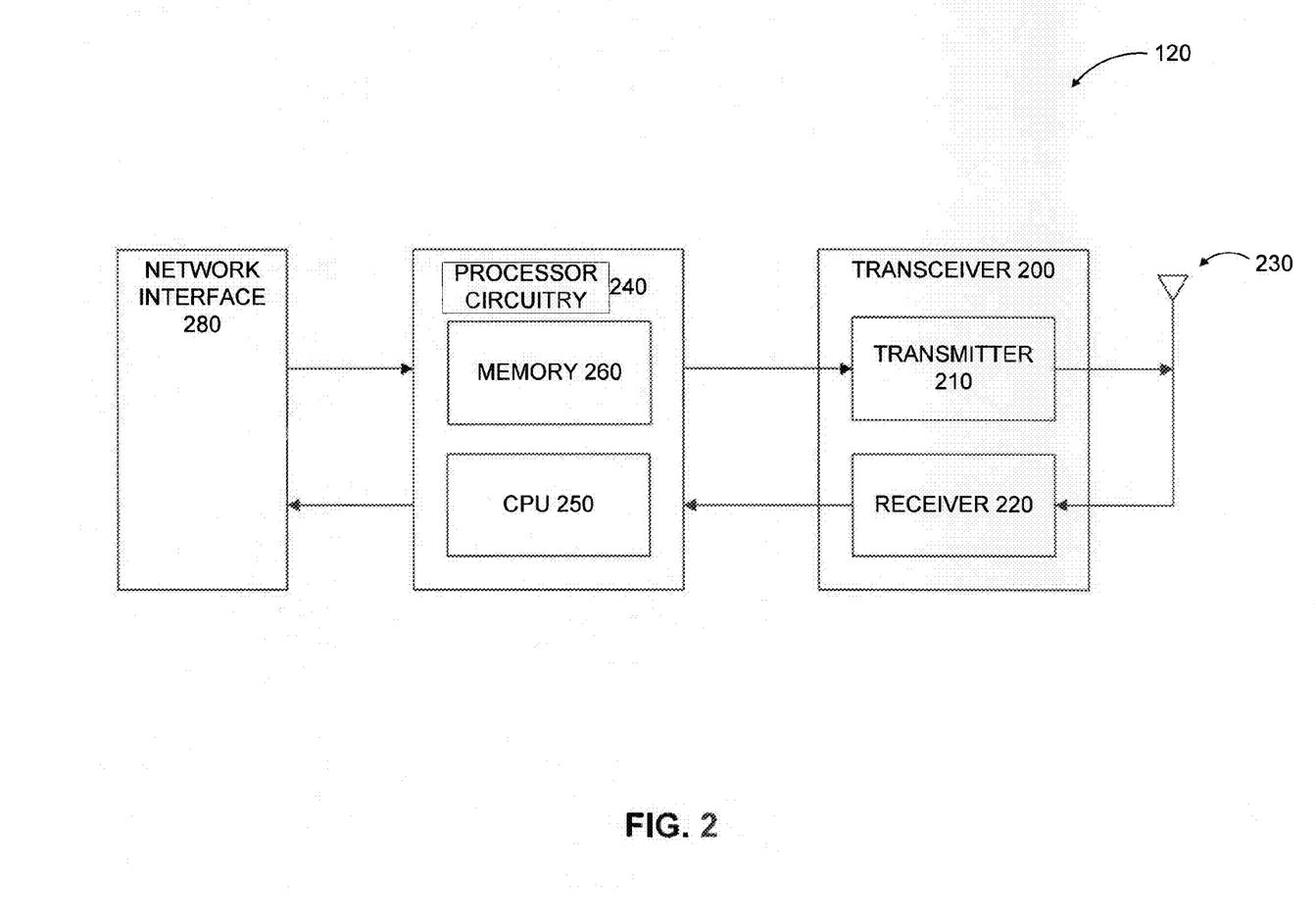
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 and a network interface 280, each communicatively coupled to processes circuitry 240.

The transceiver 200 includes one or more processors, circuitry, and/or logic that are configured to transmit and/or receive wireless communications via one or more wireless technologies within the communication environment 100. For example, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 can be configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols, The network interface 280 includes one or more processors, circuitry, and/or logic that are configured to transmit and/or receive communications via one or more wired technologies to/from one or more components of the core network (e.g., switch 115), Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples.

Further, those skilled in the relevant art(s) will understand that the network interface 280 is not limited to wired communication technologies and can be configured for communications that conform to one or more well-known wireless technologies in addition to, or alternatively to, one or more well-known wired technologies.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
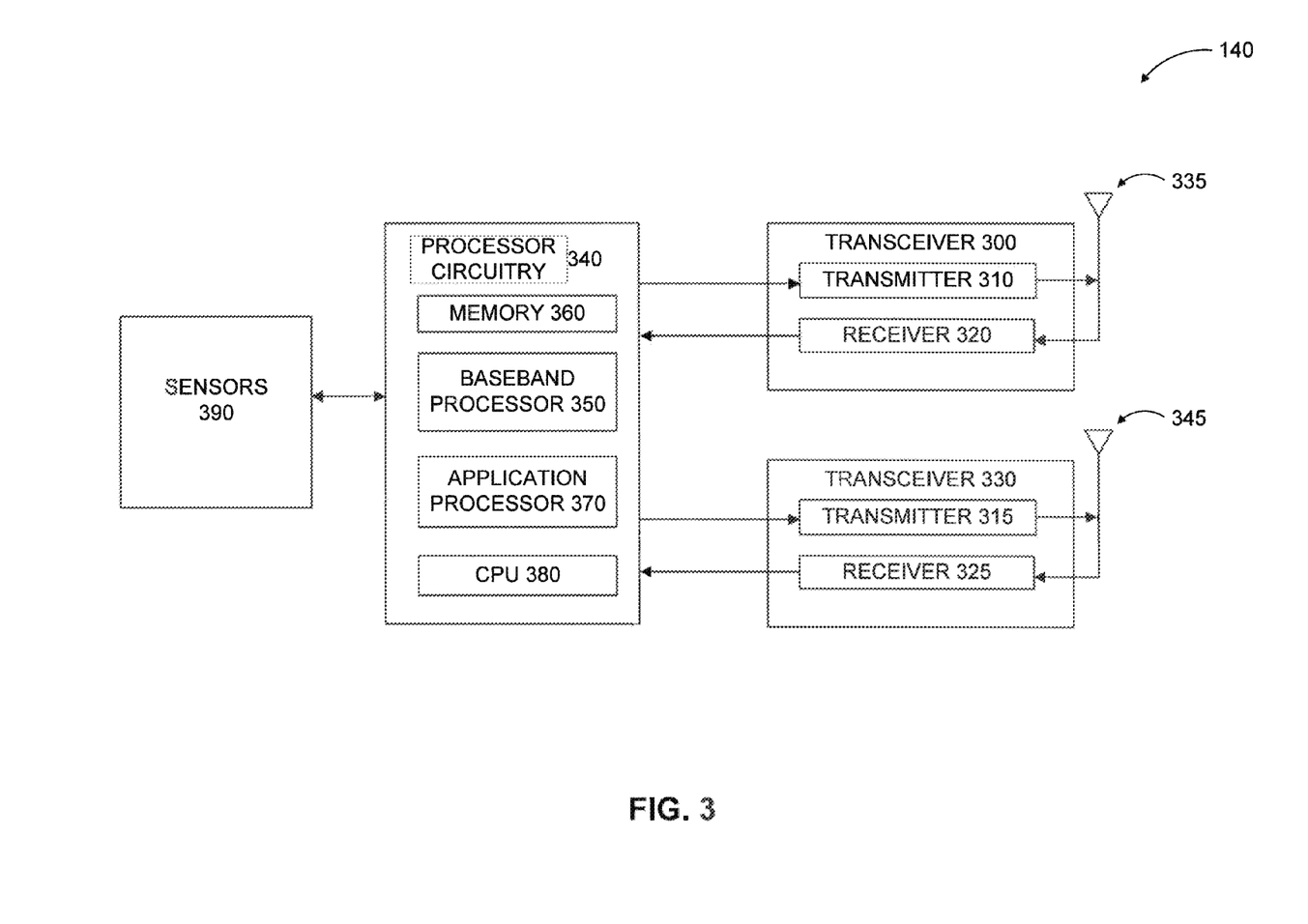
FIG. 3 illustrates a mobile device according to an exemplary embodiment of the present disclosure.

FIG. 3 illustrates the mobile device 140 according to an exemplary embodiment of the present disclosure. The mobile device 140 can include processor circuitry 340 communicatively coupled to one or more transceivers configured to communicate with one or more 3GPP and/or non-3GPP communication protocols. That is, the mobile device 140 can be configured for wireless communications conforming to one or more wireless protocols defined by 3GPP and/or one or more non-3GPP wireless protocols. In an exemplary embodiment, the mobile device 140 includes an LTE transceiver 300 and a WLAN transceiver 330. In this example, the mobile device 140 is configured for wireless communication according to 3GPP's LTE specification and for wireless communication according to IEEE's 802.11 WLAN specification. Those skilled in the relevant art(s) will understand that the mobile device 140 is not limited to these exemplary 3GPP and non-3GPP wireless protocols, and the mobile device 140 can be configured for wireless communications conforming to one or more other 3GPP and/or non-3GPP wireless protocols (e.g., NFC, Bluetooth, etc.) in addition to, or in the alternative to, the wireless protocols discussed herein, and/or to a subset of the LTE and WLAN specifications discussed above.

The LTE transceiver 300 includes one or more processors, circuitry, and/or logic that are configured for transmitting and/or receiving wireless communications conforming to 3GPP's LTE specification, in particular, the LTE transceiver 300 can include an LTE transmitter 310 and an LTE receiver 320 that have one or more processors, circuitry, and/or logic configured for transmitting and receiving wireless communications conforming to 3GPP's LTE specification, respectively, via one or more antennas 335. Transceiver 300 need not be limited to LTE, and could operate according to one or more other 3GPP and/or non-3GPP protocols, as will be understood by those skilled in art.

The WLAN transceiver 330 includes one or more processors, circuitry, and/or logic that are configured for transmitting and/or receiving wireless communications conforming to IEEE's 802.11 WLAN specification. In particular, the WLAN transceiver 330 can include a WLAN transmitter 315 and a WLAN receiver 325 that have one or more processors, circuitry, and/or logic configured for transmitting and receiving wireless communications conforming to IEEE's 802.11 WLAN specification, respectively, via one or more antennas 345. Transceiver 330 need not be limited to WLAN, and could operate according to one or more other 3GPP and/or non-3GPP protocols, as will be understood by those skilled in art.

In exemplary embodiments, the LTE transceiver 300 and the WLAN transceiver 330 can include (but are not limited to) a digital signal processer (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antennas 335 and/or 345 may include an integer array of antennas, and that the antennas may be capable of both transmitting and receiving wireless communication signals. It will also be understood by those skilled in the relevant art(s) that any combination of the LTE transceiver 300 and WLAN transceiver 330, as well as one or more other transceivers, circuits, and/or processors may be embodied in a single chip and/or die.

The processor circuitry 340 includes one or more processors, circuitry, and/or logic that are configured to control the overall operation of the mobile device 140, including the operation of the LTE transceiver 300 and WLAN transceiver 330. The one or more processors can include one or more baseband processors 350, one or more application processors 370, and/or one or more other processors (CPUs) 380. As would be understood by those skilled in the relevant arts, any combination of the baseband processor(s) 350, application processor(s) 370 and/or processor(s) 380 may be embodied as a single chip and/or die.

The processor circuitry 340 can further include a memory 360 that stores data and/or instructions, where when the instructions are executed by the baseband processor(s) 350, and/or application processor(s) 370, and/or CPUs 380 to perform the functions described herein. Similarly, the memory 360 can be any well-known volatile and/or non-volatile memory, and can be non-removable, removable, or a combination of both.

The baseband processors) 350 can be configured to control the operation of the LTE transceiver 300 and/or WLAN transceiver 330, including transmitting and/or receiving of wireless communications via the LTE transceiver 300 and/or WLAN transceiver 330, and/or perform one or more baseband processing functions, including (but not limited to), for example, media access control (MAC), encoding/decoding, modulation/demodulation, data symbol mapping, error correction, and the like.

The application processors) 370 can be configured to carry out instructions to perform, arithmetical, logical, and/or input/output (I/O) operations of the mobile device 140 and/or of one or more components of the mobile device 140. For example, the application processor(s) 370 can be configured to carry out internally-stored instructions and/or instructions stored in memory 360, including the running of one or more applications and/or operating systems, including user applications.

The processors) (CPU) 380 can be configured to control the operation of the mobile device 140, such as power management (e.g. battery control and monitoring), display settings, volume control, and/or user interactions via. one or more user interfaces.

In exemplary embodiments, the baseband processors) 350, the application processor(s) 370, and/or the processor(s) (CPU) 380 can be implemented in a single processor or in two or more distinct processors, and/or can be implemented in a single chip and/or die, or in two or more chips and/or dies.

In an exemplary embodiment, the mobile device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS) the Chinese BeiDou navigation system, and/or the Indian Regional Navigational Satellite System (IRNSS) to provide some examples. Further, the mobile device 140 can include one or more positional and/or movement sensors 390 (e.g., GPS, accelerometer, gyroscope sensor, etc.) implemented in (and/or in communication with) the mobile device 140. Here, the location and/or movement of the mobile device 140 can be determined using one or more transceivers configured for navigation purposes, one or more of the positional and/or movement sensors 390, and/or one or more positional determinations using signal characteristics relative to one or more base stations and/or access points.

As set forth in one or more of the 3GPP TS 36 Series specifications, LTE downlink and uplink transmissions are organized into radio frames each having a duration of 10 milliseconds (ms). Here, a radio frame consists of 10 subframes, each sub frame consisting of two consecutive 0.5 ms slots. Each slot comprises six OFDM symbols for an extended cyclic prefix and seven OFDM symbols for a normal cyclic prefix. In both the uplink and downlink, data is time and frequency multiplexed by mapping OFDM symbols to a time/frequency resource grid consisting of elementary units called resource elements (REs) that are uniquely identified by the antenna port, sub-carrier position, and OFDM symbol index within a radio frame. A group of resource elements corresponding to twelve consecutive subcarriers within a single time slot (e.g. 0.5 ms) is referred to as a resource block (RB). Further, as set forth in one or more of the 3GPP TS 36 Series specifications, an evolved packet system (EPS) bearer is a set of network parameters that define one or more data-specific treatments and/or services, for example, related to traffic flow and/or packets. The EPS bearer can be, for example, a default bearer that offers best effort service, or a dedicated bearer that defines a tunnel for one or more types of traffic. In operation, the EPS bearer is associated with one or more resource elements (REs) of the time/frequency resource grid.

In exemplary embodiments, the communication environment 100 can be configured for communications utilizing, a mobile device-to-network relay. As explained above, a mobile device-to-network relay is a mobile device 140 (e.g., mobile device 140.2. and/or 140.3) within a serving cell or sector 110 that facilitates communication between a base station (e.g., base station 120) and another mobile device 140 (e.g., mobile device 140.1) that is outside of the serving cell or sector 110. in an exemplary embodiment, the mobile devices 140.2 and/or 140.3 function as a mobile device-to-network relay that utilizes Layer 3 routing based on an evolved packet system (EPS) bearer designated for the out-of-coverage mobile device 140.1, which is in communication with the mobile device 140.2 or 104.3. In this example, the designated EPS bearer for the out-of-coverage mobile device 140 is in addition to an EPS bearer utilized by the relay mobile device 140 (e.g., mobile device 140.2 and/or 140.3) for its own communication with the base station 120. For the purposes of this disclosure, EPS bearers can also be referred to as "radio bearers," and/or "bearers," for short. Further, bearers associated with a relay mobile device can be referred to as "relay bearers" and/or "Proximity services (ProSe) relay bearers."

In another exemplary embodiment, the mobile device 140 functions as a mobile device-to-net work relay that can utilize IP routing and/or forwarding with a designated relay bearer. For example, the mobile device 140.1 functioning as the mobile device-to-network relay can utilize IP routing and forwarding to function as a relay for two or more out-of-coverage mobile devices. In this example, the device-to-network relay utilizes a designated EPS bearer (e.g., ProSe Relay bearer) for communications with the two or more out-of-coverage mobile devices in addition to an EPS bearer for its own communications between the relay mobile device and the serving base station 120. In operation, the relay mobile device 140.2/140.3 is configured to utilize IP routing and forwarding for communications using the ProSe Relay bearer to route communications to the appropriate out-of-coverage mobile device 140.1 being served by the relay mobile device 140.2 and/or 140.3.

In exemplary embodiments, the mobile devices 140.2 and/or 140.3 can be configured to function as a mobile device-to-network relay that utilizes Layer 3 routing with Mobile IP (MIP) support and/or Proxy Mobile IP v6 support (PMIP v6, or "PMIP" for short).

MIP is a network-based mobility management protocol configured to maintain the TCP connection (i.e., doesn't change the underlying TCP/IP protocol) between a mobile host and a static host while reducing the effects of location changes of the mobile host. MIP can be configured for location-independent routing of IP datagrams on the network. In operation, each mobile device is identified by a home address that disregards the mobile device's current location within the network. When the mobile device is not within its home network, the mobile device can be associated with a care-of address that identifies the mobile device's current location. Here, the mobile device's home address is associated with the local endpoint of a tunnel to its home agent and MIP specifies how the mobile device registers with its home agent and how the home agent routes datagrams to the mobile device through the tunnel, MIP is standardized by the Internet Engineering Task Force (IETF) and specified In Release for Comments (RFC) 4721, 6275, and 3775, each of which is incorporated herein by reference in its entirety.

PMIP is a network-based mobility management protocol that provides similar functionality as MIP and that can be configured for one or more access technologies independent of one or more mobile core networks. That is, PMIP enables IP mobility for a host without requiring the host to participate in mobility-related signaling and/or without requiring modifications to the host's TCP/IP Protocol stack. PMIP is standardized by the IETF and specified in RFC 5213, which is incorporated herein by reference in its entirety.

In an exemplary embodiment, the mobile devices 140.2 and/or 140.3 that are connected to the base station 120 can each include a Mobile Access Gateway (MAG). The MAG can be configured to perform mobility-related signaling on behalf of the mobile device(s) (e.g., mobile device 140.1) attached to its access links. The MAG functions as an access router for the connected mobile devices and is the first-hop router in the localized mobility management infrastructure. In operation, the MAG can be configured to obtain one or more IP addresses from a Local Mobility Anchor (LMA) and assign it to a corresponding mobile device (e.g., mobile device 140.1), retain the IP address of the mobile device 140.1 when the mobile device roams across one or more other MAGs, and tunnel traffic from the mobile device 140.1 to the LMA. The LMA can be configured as the home agent for a mobile device in a PMIP domain. The LMA functions as the topological anchor point for mobile device home network prefixes and manages the binding state of mobile device(s). The LMA includes the functional capabilities of a home agent as defined in the MIP specification (RFC 3775) along with the capabilities required for supporting the PMIP protocol. In an exemplary embodiment, the LMA is implemented in the Group Communication System Enablers (GCSE) server 113 of the core network.

In operation, when the mobile device (e.g., mobile device 140.2 and/or 140.3) connects to the base station 120, the mobile device obtains a Care-of IP address (CoA) from the Evolved Packet Core (EPC) of the network. This Care-of IP address is used by MAG to create a tunnel (e.g., a Mobile IP (MIP) tunnel) and to tunnel to the LMA. Using the MIP tunnel, the MAG obtains a Home IP Address for the mobile device 140.1 and provides the Home IP address to the mobile device 140.1. In an exemplary embodiment, the Home IP address is a permanent IP address or more permanent IP address than the CoA. The Care-of IP address (CoA) is a temporary IP address for the mobile device 140.1. In this example, the CoA allows a home agent to forward messages to the mobile device 140.1. A separate address is used because the IP address of the mobile device 140.1 that is used as host identification is topologically incorrect as it does not match the network of attachment (e.g., the network of serving cell or sector 110). The CoA is used to identify the host and the location within the IP network. In exemplary embodiments, the MIP tunnel can utilize an IP-in-IP protocol, a Generic Routing Encapsulation (GRE) protocol, and/or one or more other well-known encapsulation protocol as would understood by one of ordinary skill in the relevant arts.

In an exemplary embodiment, one or more mobile devices (e.g., mobile device 140.1) can be configured to utilize Layer 3 routing with PMIP to connect to the base station 120 through a mobile device configured as a ProSe Relay mobile device (e.g., mobile device 140.2 and/or 140.3). The mobile device 140.1 can be configured to bind to the LMA through, for example, the ProSe Relay mobile device 140.2 (as illustrated in FIG. 1) using the MAG of the ProSe Relay mobile device 140.2. In operation, the mobile device 140.1 is provided its corresponding Home IP address by the MAG of the ProSe Relay mobile device 140.2. In an exemplary embodiment, when the mobile device 140.1 connects to the base station 120 through a ProSe Relay mobile device, the mobile device 140.1 can be configured to disable its MAG. The operation of this exemplary embodiment is described in detail with reference to FIG. 5A.

In an exemplary embodiment, mobile device 140.1 connecting to the base station 120 through a ProSe Relay mobile device can include a MAG and be configured to utilize its MAG to obtain a Home IP address. In this example, the base station 120 can be configured to assign a Care-of IP address (CoA) to the mobile device 140.1 connecting to the base station 120 through a ProSe Relay mobile device (e.g., mobile device 140.2). That is, the base station 120 can assign the CoA instead of the MAG of the ProSe Relay mobile device 140.2 obtaining the CoA from the EPC of the network. In operation, the mobile device 140.1 tunnels to the LMA using the MIP tunnel and the LMA provides the mobile device 140.1 with its correspond Home IP address.

The operation of this exemplary embodiment is described in detail with reference to FIG. 5B.

In an exemplary embodiment, the one or more mobile devices (e.g., mobile device 140.1) can be configured to utilize Layer 3 routing with MIP to connect to the base station 120 through a mobile device configured as a ProSe Relay mobile device (e.g., mobile device 140.2 and/or 140.3). In this example, the Group Communication System Enablers (GCSE) server 113 can include a Home Agent and the mobile device 140.1 can include a Foreign Agent. The Home agent (HA) can include one or more processors, circuitry, and/or logic that are configured to store information about one or more mobile devices 140 whose permanent home address is in the Home agent's network (e.g., network of servicing cell or sector 110). In operation, the HA functions as a router for the mobile device(s) outside of the coverage of the network (mobile device 140.1) and tunnels datagrams for delivery to the mobile device 140.1 when the mobile device 140.1 is outside of the coverage of the network. The HA can also maintain a location directory (LD) for one or more mobile devices. The foreign agent (FA) can include one or more processors, circuitry, and/or logic that are configured to store information about the corresponding mobile device that is outside of the network coverage. The FA can also be configured to advertise a corresponding Care-of P address (CoA). The FA functions as a router and provides routing services to the mobile device 140.1 while registered. Here, the FA de-tunnels and delivers datagrams to the mobile device 140.1 that were tunneled by the corresponding HA. In operation, the mobile device 140.1 can be configured to bind to the HA through, for example, the ProSe Relay mobile device 140.2 (as illustrated in FIG. 1) using the mobile device's 140.1 FA. In operation, the mobile device 140.1 is provided its corresponding Care-of IP address (CoA) from the bases station 120. The mobile device 140.1, using the CoA, tunnels to the Home Agent (HA) and the HA provides the mobile device 140.1 with a Home IP address.

Figure 4:
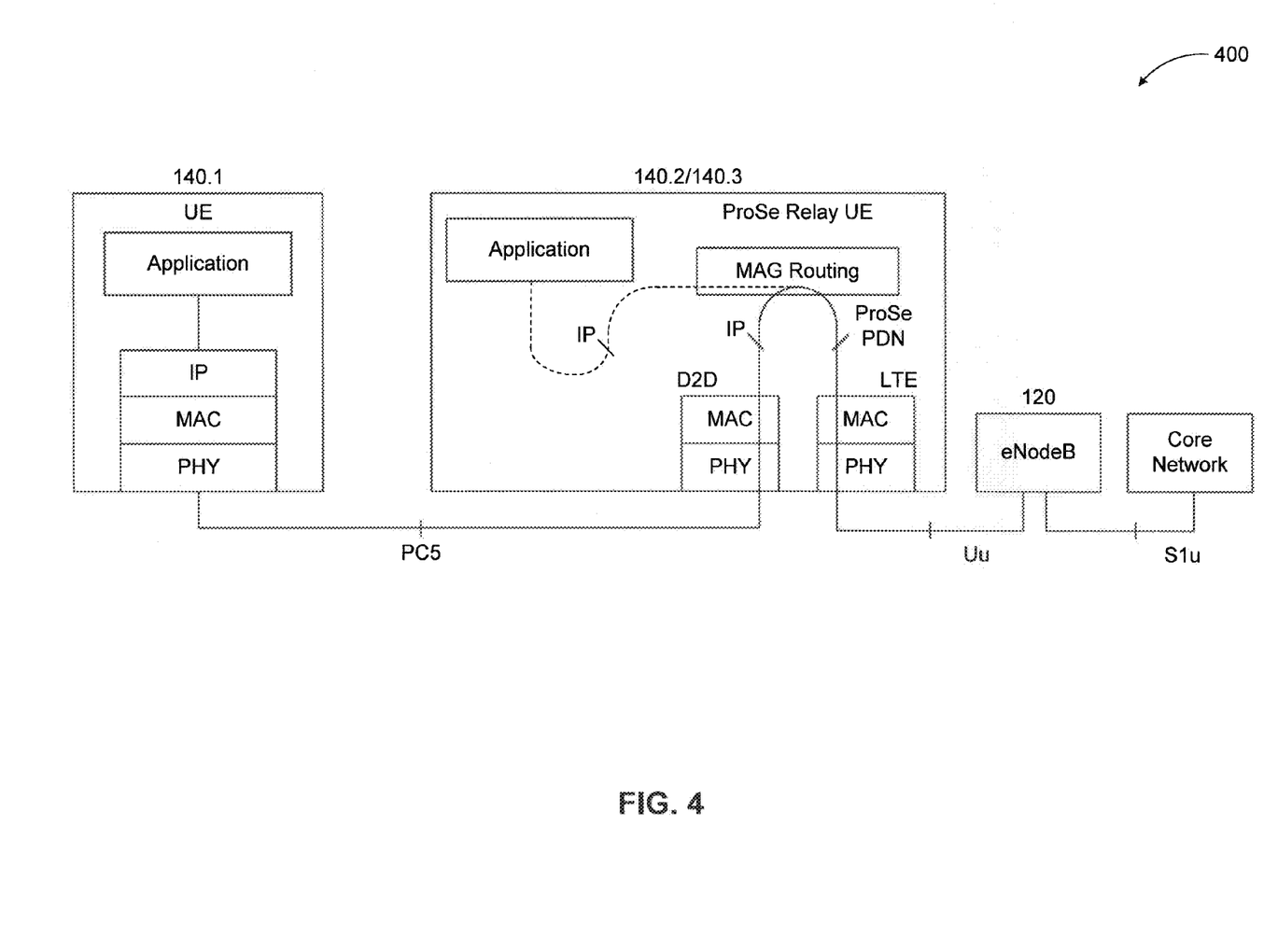
FIG. 4 illustrates a mobile device-to-network relay architecture according to an exemplary embodiment of the present disclosure.

FIG. 4 illustrates a mobile device-to-network relay architecture 400 according to an exemplary embodiment of the present disclosure. In an exemplary embodiment, the mobile device 140.2 and/or the mobile device 140.3 are within serving cell or sector 110 and served by the base station 120. The mobile device 140.2 and/or the mobile device 140.3 can be configured as a mobile device-to-network relay to route communications between the base station 120 and, for example, mobile device 140.1, which is outside of the serving cell or sector 110. (i.e., not served by the base station 120.). For example, the mobile device 140.2 routes uplink communications from the mobile device 140.1 to the base station 120, and downlink communications from the base station 120 to the mobile device 140.1.

In an exemplary embodiment, the mobile device 140.2 functioning as a mobile device-to-network relay can utilize Layer 3 routing based on an EPS bearer designated for communications with the mobile device 140.1. That is, the mobile device 140.2 can be configured to create an EPS bearer for communications to/from the mobile device 140.1 (e.g., ProSe relay bearer). In this example, the ProSe relay bearer(s) can be in addition to an EPS bearer utilized by the mobile device 140.2 for its own communications with the base station 120. That is, the mobile device 140.2 can utilize two bearers-one ProSe relay bearer and one general bearer. In operation, the mobile device 140.2 creates the ProSe relay bearer for respective downlink communications destined for the mobile device 140.1 that are received from the base station 120 on a packet data network (PDN) established between the mobile device 140.2 and base station 120. The mobile device 140.2 can be configured to identify uplink communications from the mobile devices 140.1 and can map the communications to the corresponding ProSe relay bearer for communication to the base station 120. In an exemplary embodiment, the mobile device 140.2 can use the associated EPS bearer (and not use a created ProSe relay bearer) and route communications based on source IP address(es) and/or destination IP address(es) of the communications. The device-to-device communication network established between the mobile device 140.2 and the mobile device 140.1 can utilize one or more communication protocols, including, for example, LTE and/or WLAN. An exemplary operation of the mobile device-to-network relay architecture 400 is discussed in more detail with reference to FIGS. 5A and 5B.

Figure 5A:
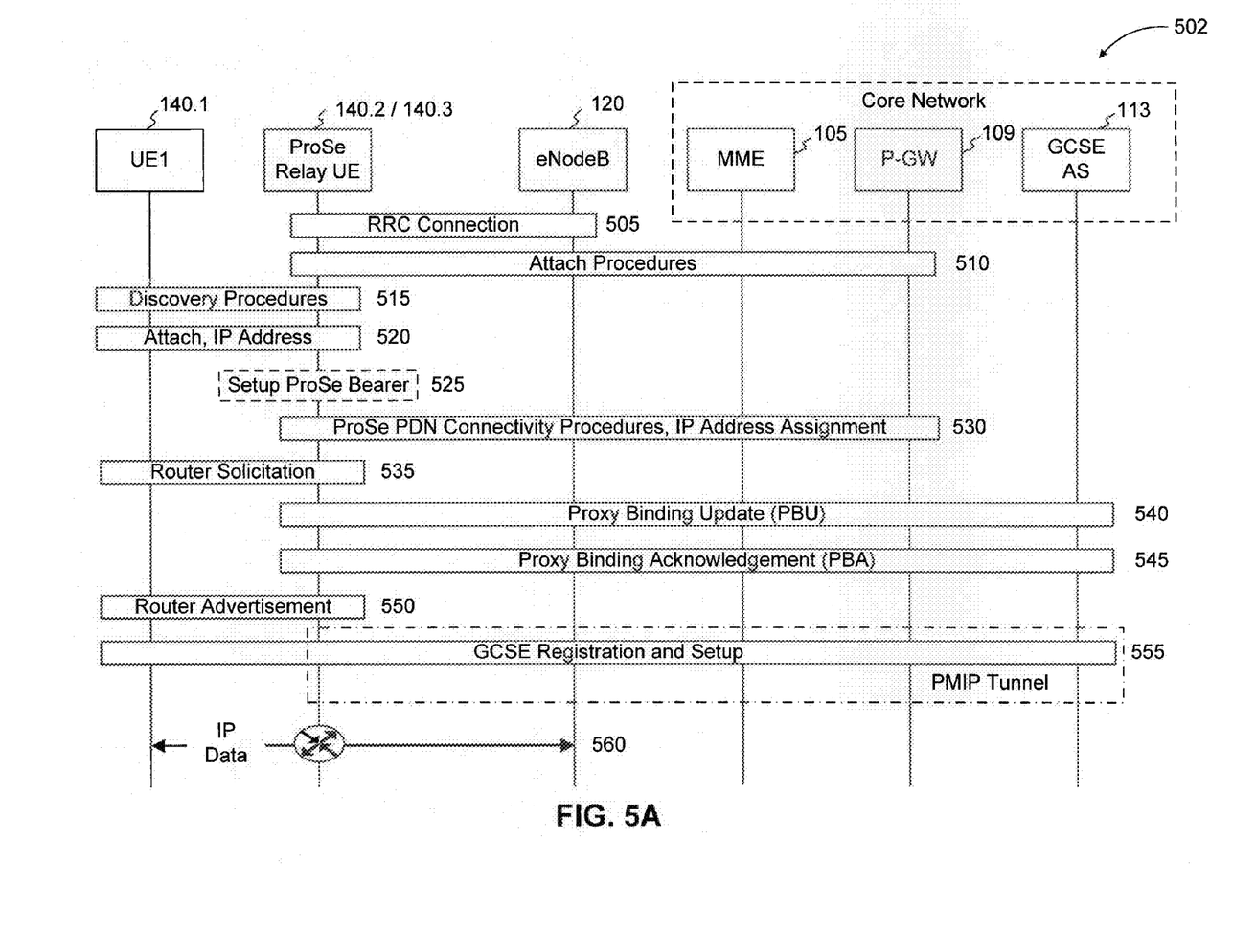
FIG. 5A illustrates a flowchart of a mobile device-to-network relay method according to an exemplary embodiment of the present, disclosure.

FIG. 5A illustrates a flowchart 502 of a mobile device-to-network relay method according to an exemplary embodiment of the present disclosure. The method of flowchart 502 is described with continued reference to one or more of FIGS. 1-4. The steps of the method of flowchart 502 are not limited to the order described below, and the various steps may be performed in a different order. Further, two or more steps of the method of flowchart 502 may be performed simultaneously with each other. For the purpose of this disclosure, flowchart 502 will be described with mobile device 140.2 operating as a ProSe Relay mobile device, but it will be understood by those skilled in the relevant arts that the mobile device 140.3 (or one or more other mobile devices within the serving cell or sector 110) can operate as a ProSe Relay mobile device.

The method of flowchart 502 begins at step 505, where the mobile device 140.2 initiates a radio resource control (RRC) connection to the base station 120 by generating an RRC connection request and provides the RRC connection request to the base station 120. The RRC connection request can include an SAE temporary mobile subscriber identity (STMSI) and an establishment cause. The STMSI includes information used by the base station 120 to identify that the mobile device 140.2 is registered with MME 105. In response to the RRC connection request, the base station 120 generates and provides an RRC connection setup message to the mobile device 140.2. The RRC connection, setup message informs the mobile device 140.2 that it now has an active connection and the mobile device 140.2 is operating in a connected mode.

After step 505, the method of flowchart 502 transitions to step 510, where the mobile device 140.2 is configured to attach to the base station 120 and the MME 105. The attachment of the mobile device 140.2 to the base station 120 and the MME 105 associates the mobile device 140.2 with the base station 120 and the MME 105. In an exemplary embodiment, the mobile device 140.1 is configured to generate and provide an RRC connection setup complete message to the base station 120 to acknowledge the RRC connection setup message. The RRC connection setup complete message can include a service request clause, which, is forwarded to the MME 105 by the base station 120. The receipt of the service request clause by the MME 105 completes the association of the mobile device 140.2 with the MME 105. The attachment of the mobile device 140.2 to the base station 120 creates a packet data network (PDN) to facilitate communication between the mobile device 140.2 and the base station 120.

After step 510, the method of flowchart 502 transitions to step 515, where the mobile device 140.1 performs a ProSe discovery procedure to determine available mobile devices (e.g., mobile device 140.2) that are configured to offer proximity services, such as the ability to function as a mobile device-to-network relay. In an exemplary embodiment, the mobile device 140.1 can be configured to perform any well-known scanning procedure to identify prospective devices that may offer proximity services.

After step 515, the method of flowchart 502 transitions to step 520, where the mobile device 140.1 can be configured to generate and provide a ProSe request to the identified device (i.e., mobile device 140.2) that is configured to offer proximity services. In this example, the ProSe request can include a request to attach 10 the mobile device 140.2 for one or more proximity services. In an exemplary embodiment, the mobile device 140.2 can be configured to assign an IP address to the mobile devices 140.1. The mobile device 140.2 can then be configured to generate and provide a ProSe request, acknowledgment message to the mobile device 140.1. The ProSe request acknowledgment message can include the IP address assigned to the mobile device 140.1 to facilitate the exchange of communications. In an exemplary embodiment the ProSe request acknowledgment message includes a Care-of IP address (CoA) to be associated with the mobile device 140.1. This CoA can be obtained horn the EPC of the network.

After step 520, the method of flowchart 502 transitions to step 525, where the mobile device 140.2 is configured to create an EPS bearer (e.g., ProSe relay bearer) for communications to/from the mobile device 140.1 in response to the ProSe request. In an exemplary embodiment, the ProSe relay beater is created in addition to an EPS bearer utilized by the mobile device 140.2 to communicate with the base station 120. In operation, the ProSe relay bearer can be used for downlink, communications destined for the mobile device 140.1 that are received from the base station 120 on a packet data network (PDN) established between the mobile device 140.2 and base station 120 and/or uplink communications from the mobile device 140.1 destined for base station 120. The mobile device 140.2 can be configured to identify uplink communications from the mobile device 140.1 and map the communications to the ProSe relay bearer for communication to the base station 120. The device-to-device communication network established between the mobile device 140.2 and 140.1 can utilize one or more communication protocols, including, for example, LTE and/or WLAN. In an exemplary embodiment, the packet data network (PDN) and corresponding EPS bearer created during the attachment procedures of step 510 can be configured for communications to/from the mobile device 140.1 in addition to the communication between the mobile device 140.2 and the base station 120. In this example, the mobile device 140.2 can omit the generation of the additional ProSe relay bearer. Further, the routing of communications by the mobile device 140.2 can be based on, for example, source IP address(es) and/or destination IP address(es) associated with the communications.

After step 525, the method of flowchart 502 transitions to step 530, where the mobile device 140.2 is configured to perform a proximity services (ProSe) packet data network (PDN) connection procedure to enable the mobile device 140.2 to operate as a mobile device-to-network relay for the mobile device 140.1. In an exemplary embodiment, the mobile device 140.2 generates a ProSe PDN connection request identifying the created ProSe relay bearer and provides the request to the base station 120, which forwards the request to the gateway 109. The ProSe PDN connection request message can include identification information—such as one or more internet protocol (IP) addresses associated with the mobile device 140.1, including, for example, the Care-of IP Address (CoA). In response to the request, the gateway 109 generates and provides a ProSe PDN connection acknowledgement message to the mobile device 140.2 via the base station 120.

After step 530, the method of flowchart 502 transitions to step 535, where the mobile device 140.1 is configured to perform a router solicitation operation to obtain a Home IP address from the LMA within the GCSE server 113 using the Care-of IP address (CoA). That is, the CoA can be used by the Mobile Access Gateway (MAG) of the mobile device 140.2 to create a tunnel (e.g., a PMIP tunnel) and to tunnel to the LMA. The mobile device 140.1 can obtain a Home IP address from the core network (e.g., GCSE server 113) using the created tunnel.

After step 535, the method of flowchart 502 transitions to step 540, where the mobile device 140.2 is configured to generate a Proxy Binding Update (PBU) message and to transmit the PBU message to the LMA within the GCSE server 113. In an exemplary embodiment, the Mobile Access Gateway (MAG) of the mobile device 140.2 can be configured to send the PBU message to the LMA. The PBU is a request message that establishes a binding between the mobile device's 140.1 home network prefix(es) assigned to an interface of the mobile device 140.1 and the Care-of IP address (CoA) of the mobile device 140.1. In an exemplary embodiment, the PBU message includes a request for a Home IP address from the LMA. In an exemplary embodiment, the PBU can be generated in response to a router solicitation message.

After step 540, the method of flowchart 502 transitions to step 545, where the LMA is configured to generate a Proxy Binding Acknowledgement (PBA) message and to transmit the PBA message to the mobile device 140.2. In an exemplary embodiment, the PBA message can include a Home IP address generated by the LMA that is to be associated with the mobile device 140.1. In an exemplary embodiment, the PBA message is generated in response to the PBU message.

After step 545, the method of flowchart 502 transitions to step 550, where the mobile device 140.2 is configured to perform a router advertisement operation to provide the Home IP address the mobile device 140.1. In an exemplary embodiment, a router advertisement message can include prefixes that are used for determining whether another address shares the same link (on-link determination) and/or address configuration, a suggested hop limit value, etc. In an exemplary embodiment, a router advertisement message is generated based on a PBA message.

After step 550, the method of flowchart 502 transitions to step 555, where the mobile device 140.1 is configured to register with the core network to facilitate communication with the core network via the mobile device 140.2. In an exemplary embodiment, the registration can include group communication system enablers (GCSE) registration. In an exemplary embodiment, the mobile device 140.1 registers with the GCSE server 113. The registration can utilizes the tunnel (e.g., PMIP tunnel) created by the Mobile Access Gateway (MAG) of the mobile device 140.2. The MAG can be configured to map the mobile device 140.1 to the tunnel created between the mobile device 140.2 and the GCSE server 113.

After step 555, the method of flowchart 502 transitions to step 560, where the mobile device 140.1 is configured to communicate with the base station 120 via the mobile device 140.2 functioning as a mobile device-to-network relay. In operation, the mobile device 140.2 can identify communications received from the base station 120 as communications destined for the mobile device 140.1 (i.e., "relay communications") based on the communications being received using the ProSe relay bearer. In this example, the mobile device 140.2 can identify the ProSe relay bearer based on one or more resource elements (REs) and/or resource blocks (RBs) being used for the communication. The mobile device 140.2 can be configured to forward the communications identified as out-of-coverage communications to the mobile device 140.1. Similarly, for communications received from the mobile device 140.1 via the device-to-device communication network, the mobile device 140.2 can be configured to identify such communications as relay communication. In this example, the mobile device 140.2 can identify the received communications based on the source IP address associated with the communications (e.g., the Home IP address). That is, the mobile device 140.2 can identity that the received communications originated from the mobile device 140.1 by identifying that the source IP address matches the Home IP address associated with the mobile device 140.1. In an exemplary embodiment, the mobile device 140.2 can generate and/or utilize one or more IP routing tables to process the received communications. The mobile device 140.2 can then be configured to map the communications to the ProSe relay bearer. Here, the base station 120 can be configured to identify the communications as coming from the mobile device 140.1 because the communications are carried over the ProSe relay bearer, and therefore the base station 120 can determine that such communications are from the out-of-coverage mobile device 140.1.

Figure 5B:
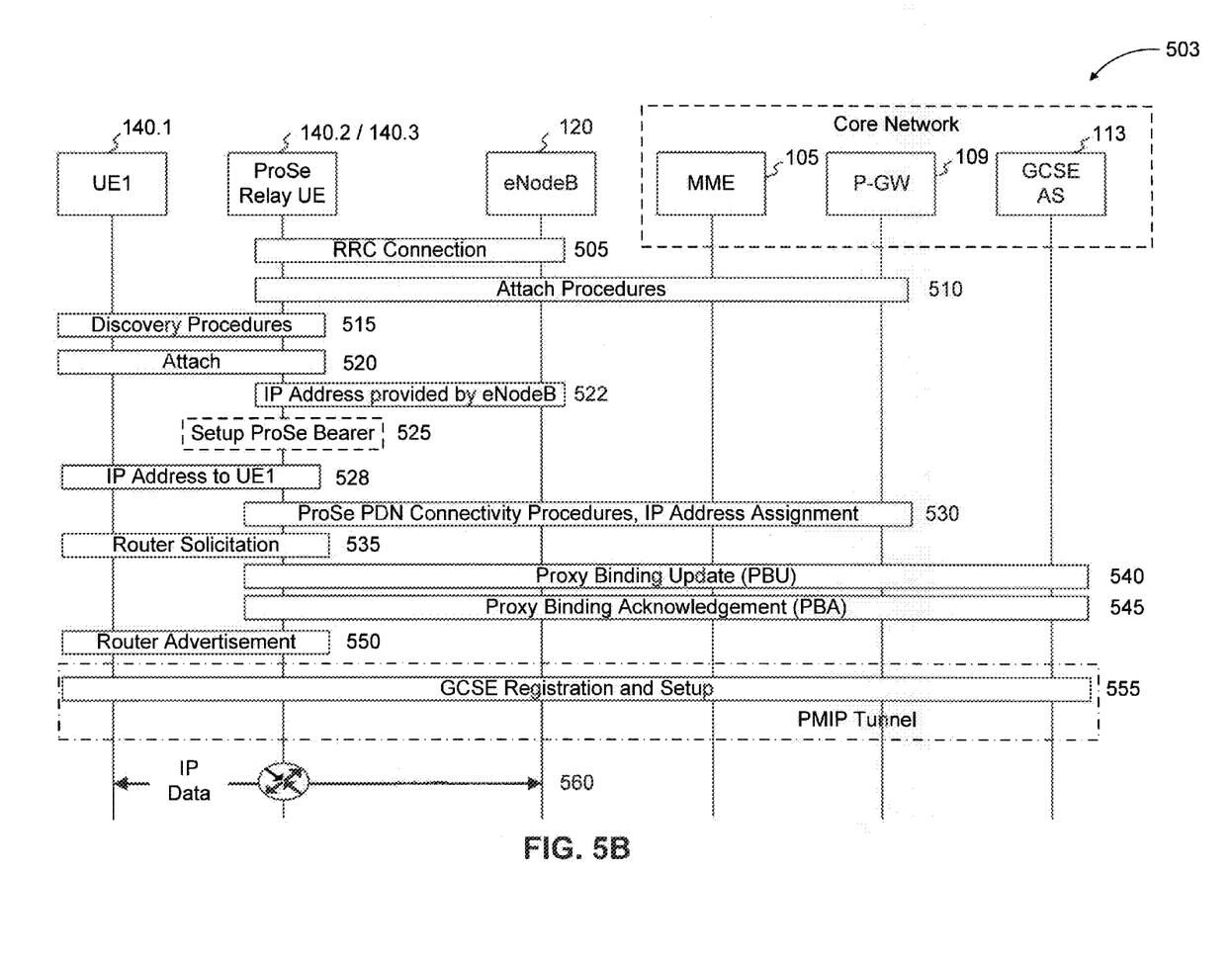
FIG. 5B illustrates a flowchart of a mobile device-to-network relay method according to an exemplary embodiment of the present disclosure.

FIG. 5B illustrates a flowchart 503 of a mobile device-to-network relay method according to an exemplary embodiment of the present disclosure. The method of flowchart 503 is described with continued reference to one or more of FIGS. 1-5A. The steps of the method of flowchart 503 are not limited to the order described below, and the various steps may be performed in a different order. Further, two or more steps of the method of flowchart 503 may be performed simultaneously with each other. For the purpose of this disclosure, flowchart 503 will be described with mobile device 140.2 operating as a ProSe Relay mobile device, but it will be understood by those skilled in the relevant arts that the mobile device 140.3 (or one or more other mobile devices within the serving cell or sector 110) can operate as a ProSe Relay mobile device.

The method of flowchart 503 begins at step 505, where the mobile device 140.2 initiates a radio resource control (RRC) connection to the base station 120 by generating an RRC connection request and provides the RRC connection request to the base station 120. The RRC connection request can include an SAE temporary mobile subscriber identity (STMSI) and an establishment cause. The STMSI includes information used by the base station 120 to identity that the mobile device 140.2 is registered with MME 105. In response to the RRC connection request, the base station 120 generates and provides an RRC connection setup message to the mobile device 140.2. The RRC connection setup message informs the mobile device 140.2 that it now has an active connection and the mobile device 140.2 is operating in a connected mode.

After step 505, the method of flowchart 503 transitions to step 510, where the mobile device 140.2 is configured to attach to the base station 120 and the MME 105. The attachment of the mobile device 140.2 to the base station 120 and the MME 105 associates the mobile device 140.2 with the base station 120 and the MME 105. In an exemplary embodiment, the mobile device 140.1 is configured to generate and provide an RRC connection setup complete message to the base station 120 to acknowledge the RRC connection setup message. The RRC connection setup complete message can include a service request clause, which is forwarded to the MME 105 by the base station 120. The receipt of the service request clause by the MME 105 completes the association of the mobile device 140.2 with the MME 105. The attachment of the mobile device 140.2 to the base station 120 creates a packet data network (PDN) to facilitate communication between the mobile device 140.2 and the base station 120.

After step 510, the method of flowchart 503 transitions to step 515, where the mobile device 140.1 performs a ProSe discovery procedure to determine available mobile devices (e.g., mobile device 140.2) that are configured to offer proximity services, such as the ability to function as a mobile device-to-network relay. In an exemplary embodiment, the mobile device 140.1 can be configured to perform any well-known scanning procedure to identify prospective devices that may offer proximity services.

After step 515, the method of flowchart 502 transitions to step 520, where the mobile device 140.1 can be configured to generate and provide a ProSe request to the identified device (i.e., mobile device 140.2) that is configured to offer proximity services. In this example, the ProSe request can include a request to attach to the mobile device 140.2 for one or more proximity services.

After step 520, the method of flowchart 503 transitions to step 522, where the base station 120 is configured to provide the mobile device 140.2 with identification information— such as one or more internet protocol (IP) addresses—for assignment to prospective mobile device(s) 140 (e.g., mobile device 140.1) seeking ProSe connection(s) to the mobile device 140.2. In an exemplary embodiment, the providing of the identification information can be in response to a request for such identification information by the mobile device 140.2.

After step 522, the method of flowchart 503 transitions to step 525, where the mobile device 140.2 is configured to create an EPS bearer (e.g., ProSe relay bearer) for communications to/from the mobile device 140.1 in response to the ProSe request. In an exemplary embodiment, the ProSe relay bearer is created in addition to an EPS bearer utilized by the mobile device 140.2 to communicate with the base station 120. In operation, the ProSe relay bearer can be used for downlink communications destined for the mobile device 140.1 that are received from the base station 120 on a packet data network (PDN) established between the mobile device 140.2 and base station 120 and/or uplink communications from the mobile device 140.1 destined for base station 120. The mobile device 140.2 can be configured to identify uplink communications from the mobile device 140.1 and map the communications to the ProSe relay bearer for communication to the base station 120. The device-to-device communication network established between the mobile device 140.2 and 140.1 can utilize one or more communication protocols, including, for example, LTE and/or WLAN. In an exemplary embodiment, the packet data network (PDN) and corresponding EPS bearer created during the attachment procedures of step 510 can be configured for communications to/from the mobile device 140.1 in addition to the communication between the mobile device 140.2 and the base station 120. In this example, the mobile device 140.2 can omit the generation of the additional ProSe relay bearer.

After step 525, the method of flowchart 503 transitions to step 528, where an IP address assigned to the mobile device 140.1 by the base station 120 is provided to the mobile device 140.1 by the mobile device 140.2. The assigned IP address corresponds to the IP address received by the mobile device 140.2 during the reception of identification information from the base station 120 in step 522. In an exemplary embodiment, the assigned IP address is a temporary IP address that is assigned to the mobile device 140.1. In an exemplary embodiment, the temporary IP address is a Care-of IP address (CoA) to be associated with the mobile device 140.1, That is, in this exemplary embodiment, the base station 120 is configured to assign a CoA to the mobile device 140.1 seeking to connect to the base station 120 via a relay rather than the Mobile Access Gateway (MAG) of the mobile device 140.2.

After step 528, the method of flowchart 503 transitions to step 530, where the mobile device 140.2 is configured to perform a proximity services (ProSe) packet data network (PDN) connection procedure to enable the mobile device 140.2 to operate as a mobile device-to-network relay for the mobile device 140.1. In an exemplary embodiment, the mobile device 140.2 generates a ProSe PDN connection request identifying the created ProSe relay bearer and provides the request to the base station 120, which forwards the request to the gateway 109. The ProSe PDN connection request message can include identification information— such as one or more internet protocol (IP) addresses associated with the mobile device 140.1, including, for example, the Care-of IP Address (CoA). In response to the request, the gateway 109 generates and provides a ProSe PDN connection acknowledgement message to the mobile device 140.2 via the base station 120.

After step 530, the method of flowchart. 503 transitions to step 535, where the mobile device 140.1 is configured to perform a router solicitation operation to obtain a Home IP address from the LMA using the Care-of IP address (CoA). That is, the CoA can be used by the Mobile Access Gateway (MAG) of the mobile device 140.1 to create a tunnel (e.g., a PMIP tunnel), and to tunnel to the LMA to obtain a Home IP address from the LMA.

After step 535, the method of flowchart 503 transitions to step 540, where the mobile device 140.2 is configured to generate a Proxy Binding Update (PBU) message and to transmit the 140.2 message to the LMA within the GCSE server 113. In an exemplary embodiment the Mobile Access Gateway (MAG) of the mobile device 140.2 can be configured to send the PBU message to the LMA. The PBU is a request message that establishes a binding between the mobile device's 140.1 home network prefix(es) assigned to an interface of the mobile device 140.1 and the Care-of IP address (CoA) of the mobile device 140.1. In an exemplary embodiment, the PBU message includes a request for a Home IP address from the LMA.

After step 540, the method of flowchart 503 transitions to step 545, where the LMA within the GCSE server 113 is configured to generate a Proxy Binding Acknowledgement (PBA) message and to transmit the PBA message to the mobile device 140.2. In an exemplary embodiment, the PBA message can include a Home IP address generated by the LMA that is to be associated with the mobile device 140.1.

After step 545, the method of flowchart 503 transitions to step 550, where the mobile device 140.2 is configured to perform a router advertisement operation to provide the Home IP address the mobile device 140.1. In an exemplary embodiment, a router advertisement message can include prefixes that are used for determining whether another address shares the same Sink (on-link determination) and/or address configuration, a suggested hop limit value, etc. In an exemplary embodiment, a router advertisement message is generated based on a PBA message.

After step 550, the method of flowchart 503 transitions to step 555, where the mobile device 140.1 is configured to register with the core network to facilitate communication with the core network via the mobile device 140.2. In an exemplary embodiment, the registration can include group communication system enablers (GCSE) registration. In an exemplary embodiment, the mobile device 140.1 registers with the GCSE server 113. The registration can utilizes the tunnel (e.g., PMIP tunnel) created by the Mobile Access Gateway (MAG) of the mobile device 140.1. The MAG can be configured to map the mobile device 140.1 to the tunnel created between the mobile device 140.1 and the GCSE server 113.

After step 555, the method of flowchart 503 transitions to step 560, where the mobile device 140.1 is configured to communicate with the base station 120 via the mobile device 140.2 functioning as a mobile device-to-network relay. In operation, the mobile device 140.2 can identify communications received from the base station 120 as communications destined for the mobile device 140.1 (i.e., "relay communications") based on the communications being received using the ProSe relay bearer. In this example, the mobile device 140.2 can identify the ProSe relay bearer based on one or more resource elements (REs) and/or resource blocks (RBs) being used for the communication. The mobile device 140.2 can be configured to forward the communications identified as out-of-coverage communications to the mobile device 140.1. Similarly, for communications received from the mobile device 140.1 via the device-to-device communication, network, the mobile device 140.2 can be configured to identify such communications as relay communication. In this example, the mobile device 140.2 can identify the received communications based on the source IP address associated with the communications (e.g., the Home IP address). That is, the mobile device 140.2 can identify that the received communications originated from the mobile device 140.1 by identifying that the source IP address matches the Home IP address associated with the mobile device 140.1. In an exemplary embodiment, the mobile device 140.2 can generate and/or utilize one or more IP routing tables to process the received communications. The mobile device 140.2 can then be configured to map the communications to the ProSe relay bearer. Here, the base station 120 can be configured to identify the communications as coming from the mobile device 140.1 because the communications are carried over the ProSe relay bearer, and therefore the base station 120 can determine that such communications are from the out-of-coverage mobile device 140.1.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a gene: at purpose computer.

In embodiments having one or more components that include one or more processors, one or more of the processors can include (and/or be configured to access) one or more internal and/or external memories that store instructions and/or code that, when executed by the processors), cause the processors) to perform one or more functions and/or operations related to the operation of the corresponding components) as described herein and/or as would appreciated by those skilled in the relevant art(s).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
a transceiver configured to communicate with a base station and a mobile device; and
processor circuitry communicatively coupled to the transceiver, the processor circuitry configured to:
receive a ProSe request from the mobile device to attach to the communication device for one or more proximity services;
generate a ProSe relay bearer to carry communications between the base station and the mobile device, wherein the ProSe relay bearer is distinct from an evolved packet system (EPS) bearer used to carry communications between the communication device and the base station;
determine temporary identification information associated with the mobile device;
generate a communication tunnel using the temporary identification information;
request identification information via the communication tunnel based on the temporary identification information; and
receive a communication from the mobile device using the transceiver and route the communication via the ProSe relay bearer to the base station based on the identification information.

2. The communication device of claim 1, wherein the processor circuitry is further configured to:
generate a Proxy Binding Update (PBU) message based on the temporary identification information to request the identification information;
receive a Proxy Binding Acknowledgment (PBA) message generated based on the PBU message.

3. The communication device of claim 2, wherein the PBA message includes the identification information.

4. The communication device of claim 2, wherein the processor circuitry is configured to generate the PBU message based on a router solicitation message received from the mobile device.

5. The communication device of claim 3, wherein the processor circuitry is further configured to:
generate a router advertisement message based on the PBA message; and
transmit, using the transceiver, the router advertisement message to the mobile device.

6. The communication device of claim 1, wherein the temporary identification information includes a Care-of internet protocol (IP) address.

7. The communication device of claim 1, wherein the identification information includes a Home internet protocol (IP) address.

8. The communication device of claim 1, wherein the communication tunnel is a Proxy Mobile Internet Protocol (PMIP) tunnel.

9. The communication device of claim 1, wherein the communication tunnel is a Mobile Internet Protocol (MIP) tunnel.

10. The communication device of claim 1, wherein the ProSe relay bearer utilizes resource elements in a time/frequency resource grid that are different from those used by the EPS bearer.

11. A communication device, comprising:
a transceiver configured to communicate with a base station and a mobile device; and
processor circuitry communicatively coupled to the transceiver, the processor circuitry configured to:
receive a ProSe request from the mobile device to attach to the communication device for one or more proximity services;
generate a ProSe relay bearer to carry communications between the base station and the mobile device, wherein the ProSe relay bearer is distinct from an evolved packet system (EPS) bearer used to carry communications between the communication device and the base station;
receive, using the transceiver, temporary identification information associated with the communication device from the mobile device;
generate a communication tunnel based on the temporary identification information, wherein the communication tunnel identifies the ProSe relay bearer;
generate a request for identification information based on the temporary identification information;
transmit the request to the base station using the communication tunnel; and
receive, using the transceiver, the identification information using the communication tunnel.

12. The communication device of claim 11, wherein the request for identification information is a router solicitation message.

13. The communication device of claim 11, wherein the processor circuitry is further configured to generate, using the transceiver, a router advertisement message, wherein the router advertisement message includes the identification information.

14. The communication device of claim 13, wherein the router advertisement message is generated based on the request for identification information.

15. The communication device of claim 11, wherein the temporary identification information includes a Care-of internet protocol (IP) address.

16. The communication device of claim 11, wherein the identification information includes a Home internet protocol (IP) address.

17. The communication device of claim 11, wherein the communication tunnel is a Proxy Mobile Internet Protocol (PMIP) tunnel.

18. The communication device of claim 11, wherein the communication tunnel is a Mobile Internet Protocol (MIP) tunnel.

19. A communication device, comprising:
a transceiver configured to communicate with a base station and a mobile device; and
processor circuitry communicatively coupled to the transceiver, the processor circuitry configured to:
receive a ProSe request from the mobile device to attach to the communication device for one or more proximity services;
generate a ProSe relay bearer to carry communications between the base station and the mobile device, wherein the ProSe relay bearer is distinct from an evolved packet system (EPS) bearer used to carry communications between the communication device and the base station;
determine temporary identification information associated with the mobile device;
generate a communication tunnel using the temporary identification information, wherein the communication tunnel identifies the ProSe relay bearer;
generate a Proxy Binding Update (PBU) message based on the temporary identification information;

transmit, using the transceiver and via the communication tunnel, the PBU message to the base station to request identification information;

receive, using the transceiver and from the base station, a Proxy Binding Acknowledgment (PBA) message generated based on the PBU message; and receive, using the transceiver, a communication from the mobile device and route the communication via the ProSe relay bearer to the base station based on the identification information.

20. The communication device of claim 19, wherein the temporary identification information includes a Care-of Internet protocol (IP) address and the identification information includes a Home IP address.

* * * * *